US008632616B2

(12) United States Patent
Azwell et al.

(10) Patent No.: US 8,632,616 B2
(45) Date of Patent: Jan. 21, 2014

(54) FIBER BED ASSEMBLY FOR A FIBER BED MIST ELIMINATOR

(75) Inventors: Douglas E. Azwell, Maryland Heights, MO (US); Frederick L. Mueller, Herculaneum, MO (US); Steven A. Ziebold, Waterloo, IL (US); Julie M. Bruemmer, St. Louis, MO (US)

(73) Assignee: MECS, Inc., Chesterfield, MO (US)

( * ) Notice: Subject to any disclaimer, the term of this patent is extended or adjusted under 35 U.S.C. 154(b) by 128 days.

(21) Appl. No.: 12/612,189

(22) Filed: Nov. 4, 2009

(65) Prior Publication Data

US 2011/0056381 A1 Mar. 10, 2011

Related U.S. Application Data

(63) Continuation-in-part of application No. 12/555,286, filed on Sep. 8, 2009.

(51) Int. Cl.
*B01D 46/00* (2006.01)

(52) U.S. Cl.
USPC .................................. 55/423; 55/486; 55/498

(58) Field of Classification Search
USPC .................. 96/334, 240, 290–300, 361–364; 55/512–519, 240, 492, DIG. 19, 55/DIG. 46; 95/214–215
See application file for complete search history.

(56) References Cited

U.S. PATENT DOCUMENTS

| 2,273,210 | A | * | 2/1942 | Lowther et al. | 285/410 |
|---|---|---|---|---|---|
| 3,721,069 | A | * | 3/1973 | Walker | 55/319 |
| 4,053,290 | A | * | 10/1977 | Chen et al. | 55/466 |
| 4,086,070 | A | * | 4/1978 | Argo et al. | 95/278 |
| 4,144,040 | A | * | 3/1979 | Claes et al. | 95/273 |
| 4,160,684 | A | | 7/1979 | Berger, Jr. et al. | |
| 4,184,858 | A | * | 1/1980 | Walker | 96/265 |
| 4,203,739 | A | * | 5/1980 | Erdmannsdorfer | 55/323 |
| 4,767,427 | A | * | 8/1988 | Barabas et al. | 55/493 |
| 4,976,759 | A | * | 12/1990 | Foltz | 55/487 |
| 5,605,748 | A | * | 2/1997 | Kennedy et al. | 55/486 |
| 5,961,678 | A | | 10/1999 | Pruette et al. | |
| 6,106,592 | A | | 8/2000 | Paranjpe | |
| 6,197,119 | B1 | | 3/2001 | Dozoretz et al. | |
| 6,387,142 | B1 | * | 5/2002 | Pieciak et al. | 55/493 |
| 6,858,051 | B2 | | 2/2005 | Uhlenbrock | |
| 7,416,576 | B2 | * | 8/2008 | Ziebold et al. | 55/486 |
| 2004/0040272 | A1 | * | 3/2004 | Uhlenbrock | 55/423 |
| 2007/0175191 | A1 | | 8/2007 | Ziebold | |
| 2007/0240391 | A1 | | 10/2007 | Becker et al. | |
| 2008/0314009 | A1 | | 12/2008 | Ziebold | |

FOREIGN PATENT DOCUMENTS

DE 10239408 A1 3/2004
WO 2004108251 A1 12/2004

OTHER PUBLICATIONS

Office action dated Dec. 6, 2011 from U.S. Appl. No. 12/555,286, 13 pages.
Office Action regarding related U.S. Appl. No. 12/555,286 dated Mar. 25, 2013, 18 pgs.

(Continued)

*Primary Examiner* — Duane Smith
*Assistant Examiner* — Thomas McKenzie
(74) *Attorney, Agent, or Firm* — Senniger Powers LLP

(57) ABSTRACT

A fiber assembly for a forward-flow fiber bed mist eliminator used to remove aerosols from a moving gas stream. The assembly incorporates an improved drainage system for draining aerosols from the fiber bed without the need for a conventional seal-leg.

24 Claims, 12 Drawing Sheets

(56) References Cited

OTHER PUBLICATIONS

Amendment C filed Jun. 25, 2013 in response to an Office Action issued Mar. 25, 2013 in related U.S. Appl. No. 12/555,286, 21 pgs.

Office action dated Jun. 18, 2012 from U.S. Appl. No. 12/555,286, 14 pages.

* cited by examiner

FIBER BED ASSEMBLY FOR A FIBER BED MIST ELIMINATOR

CROSS-REFERENCE TO RELATED APPLICATION

This application is a continuation-in-part of U.S. patent application Ser. No. 12/555,286, filed Sep. 8, 2009, which is hereby incorporated by reference in its entirety.

FIELD OF THE INVENTION

The present invention generally relates to the separation of particulates (liquid and/or solid) from gas streams and, more particularly, to a fiber bed assembly for use in a fiber bed mist eliminator.

BACKGROUND OF THE INVENTION

Fiber bed mist eliminators have found wide application in the removal of suspensions of liquid and soluble and insoluble solid particles (i.e., aerosols) from gas streams emitted from a variety of industrial processes. For convenience, the term "aerosols" as used herein and in the claims refers collectively to gaseous suspensions of liquid and/or solid particles that may be soluble or insoluble in the entrained liquid. Some of the more frequent applications include removal of acid mists, such as sulfuric acid mists, in acid manufacturing, removal of plasticizer mists in the manufacture of polyvinyl chloride floor or wall coverings and removal of water soluble solid aerosols from the emissions of ammonium nitrate prill towers. In these various applications, fiber bed mist eliminators may achieve separation efficiencies of 99% or greater.

Fiber bed mist eliminators typically comprise one or more substantially vertical cylindrical fiber bed elements installed in a suitable vessel. Conventional fiber bed elements comprise beds of collecting fibers in contact with wire screens or similar support structures. The fiber bed is designed to collect liquid mists and soluble solid particles entrained in the moving gas stream and drain them through the structure of the bed. More particularly, during operation of a fiber bed mist eliminator, a stream of gas containing an aerosol is made to penetrate and pass through the fiber bed of the fiber bed element with a horizontal component of movement. The fibers in the fiber bed capture the aerosol in the gas by the mechanisms of impaction, interception, and/or Brownian diffusion. Captured liquid particles coalesce on the fibers to form droplets of liquid in the fiber bed. The moving gas urges the droplets to move toward the downstream face of the fiber bed as gravity pulls the captured liquid downward.

Liquid and/or soluble solids collected by the fiber bed drain through the fiber bed and/or on the downstream surface thereof to the bottom of the fiber bed. From there, the collected material is drained, as through a liquid drain pipe (sometimes referred to as a "seal leg") having a lower end received in a suitable seal-leg cup or vessel filled with liquid to prevent the escape of gas through the drain pipe. U.S. Pat. Nos. 4,053,290, 4,086,070, 6,106,592 and 7,416,576 disclose seal-leg drain arrangements of this type.

While the operation of a seal-leg drain has proven to be generally satisfactory, this type of drain has the disadvantage of substantially increasing the overall length of the fiber bed assembly. (Seal legs are often two to three feet long.) Further, the seal-leg cup must be filled prior to operation or after failure of the seal due to a pressure spike during the process. Still further, seal legs threaded into the bottom plate of a mist eliminator can become loose if improperly installed, which can cause failure of the seal and bypass of gas around the collection media. Accordingly, there is a need for a fiber assembly which eliminates these disadvantages.

SUMMARY OF THE INVENTION

This invention is directed to a fiber bed assembly for a forward-flow fiber bed mist eliminator used to remove aerosols from a moving gas stream. In one embodiment, the fiber bed assembly comprises a fiber bed support having an upper end, a lower end, and a substantially cylindrical wall extending between the upper and lower ends defining an exterior upstream space outside the wall and an interior downstream space inside the wall. The wall has openings therein to permit the gas stream to move generally freely through the wall from the exterior upstream space to the interior downstream space. A fiber bed is supported by the fiber bed support and generally blocks the wall openings so that the gas stream passes through the fiber bed moving from the exterior upstream space to the interior downstream space. The fiber bed comprises collecting fiber media and has a top end margin, a bottom end margin, an upstream surface and a downstream surface. A base adjacent the lower end of the fiber bed support blocks movement of the gas stream down through a lower end of the interior downstream space. An opening is provided adjacent an upper end of the fiber bed support for exit of the gas stream from the interior downstream space. A gas-impervious veil spaced upstream from the downstream surface of the fiber bed at the bottom end margin of the fiber bed. The veil has an upper end and a lower end and is constructed to block flow of the gas stream into at least a portion of the fiber bed to provide a gas-shielded drainage area in the fiber bed between the gas-impervious veil and the downstream surface of the fiber bed for drainage of aerosols from the fiber bed.

In another embodiment, the fiber bed assembly comprises a fiber bed support having an upper end, a lower end, and a substantially cylindrical wall extending between the upper and lower ends defining an exterior upstream space outside the wall and an interior downstream space inside the wall. The wall has openings therein to permit the gas stream to move generally freely through the wall from the exterior upstream space to the interior downstream space. A fiber bed is supported by the fiber bed support and generally blocks the wall openings so that the gas stream passes through the fiber bed moving from the exterior upstream space to the interior downstream space. The fiber bed comprises collecting fiber media and has a top, a bottom, an upstream surface and a downstream surface. A base adjacent the lower end of the fiber bed support blocks movement of the gas stream down through a lower end of the interior downstream space. An opening is provided adjacent an upper end of the fiber bed support for exit of the gas stream from the interior downstream space. The base comprises a top wall for blocking downward flow of the gas stream in the interior downstream space, a side wall projecting down from the top wall and in generally opposing relation with a portion of the downstream surface of the fiber bed for blocking the flow of the gas stream from the fiber bed into the downstream space through said downstream surface portion, and a flange extending from the side wall under the bottom of the fiber bed.

In another aspect of this invention, a fiber bed assembly for a fiber bed mist eliminator is used to remove aerosols from a moving gas stream. The fiber bed assembly comprises a fiber bed support having a wall defining an upstream space and a downstream space. The wall has openings to permit the gas stream to move generally freely through the wall from the upstream space to the downstream space. A fiber bed is supported by the fiber bed support and generally blocks the wall openings so that the gas stream passes through the fiber bed moving from the upstream space to the downstream space. The fiber bed comprises collecting fiber media and has a top, a bottom, an upstream surface and a downstream surface. A base comprises a flange extending under the bottom of the fiber bed and a leg extending downwardly from the base. The leg has a passage therein for draining collected aerosols collected by the fiber bed assembly, the passage being packed with a fibrous packing material having a density greater than the density of the fiber bed.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
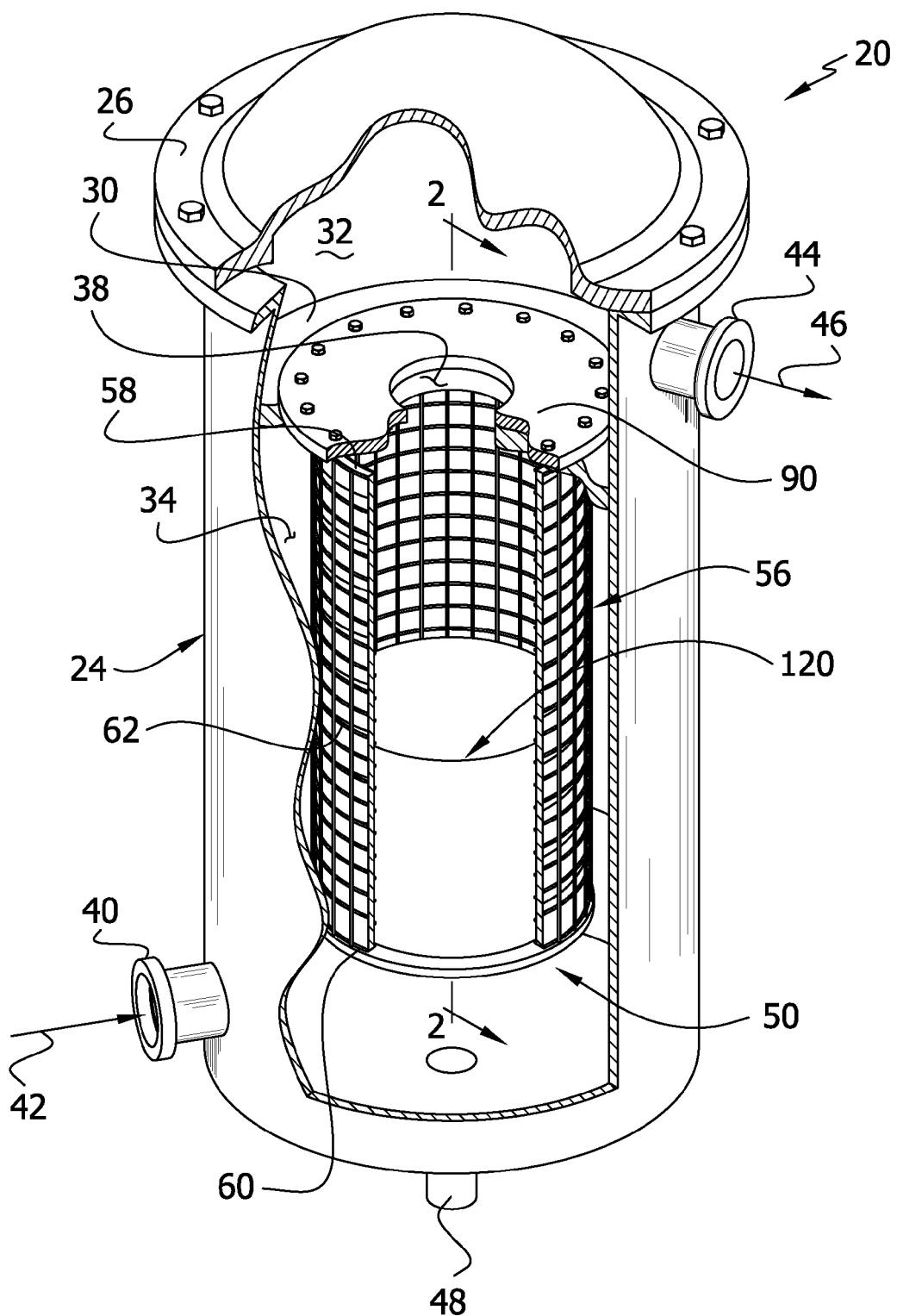
FIG. 1 is a perspective of a fiber bed mist eliminator incorporating a first embodiment of a fiber bed assembly of this invention.

Referring now to the drawings and in particular to FIG. 1, a mist eliminator, indicated generally at 20, is of the type that can be placed in the flow line of a stream of gas to remove aerosols from the stream of gas. The mist eliminator 20 includes a tank, generally indicated at 24, having a removable lid 26 sealingly attached to the tank to close an open top of the tank. A mounting plate 30 within the tank divides the tank into an upper chamber 32 and a lower chamber 34. The illustrated mist eliminator 20 of FIG. 1 is a "forward-flow" mist eliminator in which a gas stream passes from the lower chamber 34 in a forward direction to the upper chamber 32 through an opening 38 in the mounting plate 30. The tank 24 includes a gas stream inlet 40 for receiving a stream of gas 42 ladened with aerosols into the lower chamber 34 of the tank, and a filtered, clean gas stream outlet 44 in fluid communication with the upper chamber 32 in the tank to permit filtered, clean gas 46 to pass out of the mist eliminator to an exhaust or other processing equipment (not shown). An external drain pipe 48 at or near the bottom of the tank 24 drains off aerosols that are collected at the bottom of the tank.

A fiber bed assembly, indicated generally at 50, is located in the lower chamber 34 of the tank 24 and has a generally tubular shape with a closed bottom and an open top. The fiber bed assembly 50 is sealingly mounted on the mounting plate 30 so that an open top of the fiber bed assembly is in registration with the opening 38 in the mounting plate. Gas cannot flow from the lower chamber 34 to the upper chamber 32 unless it passes in a forward direction (indicated by arrows 42, 46 in FIGS. 1-3) through the fiber bed assembly 50. The mounting plate 30 supports the fiber bed assembly 50 within the tank 24 so that the fiber bed assembly hangs down from the mounting plate. The fiber bed assembly 50 removes a very high percentage of the aerosols from the gas stream 42. The aerosols are drained in a manner to be described later.

Figure 2:
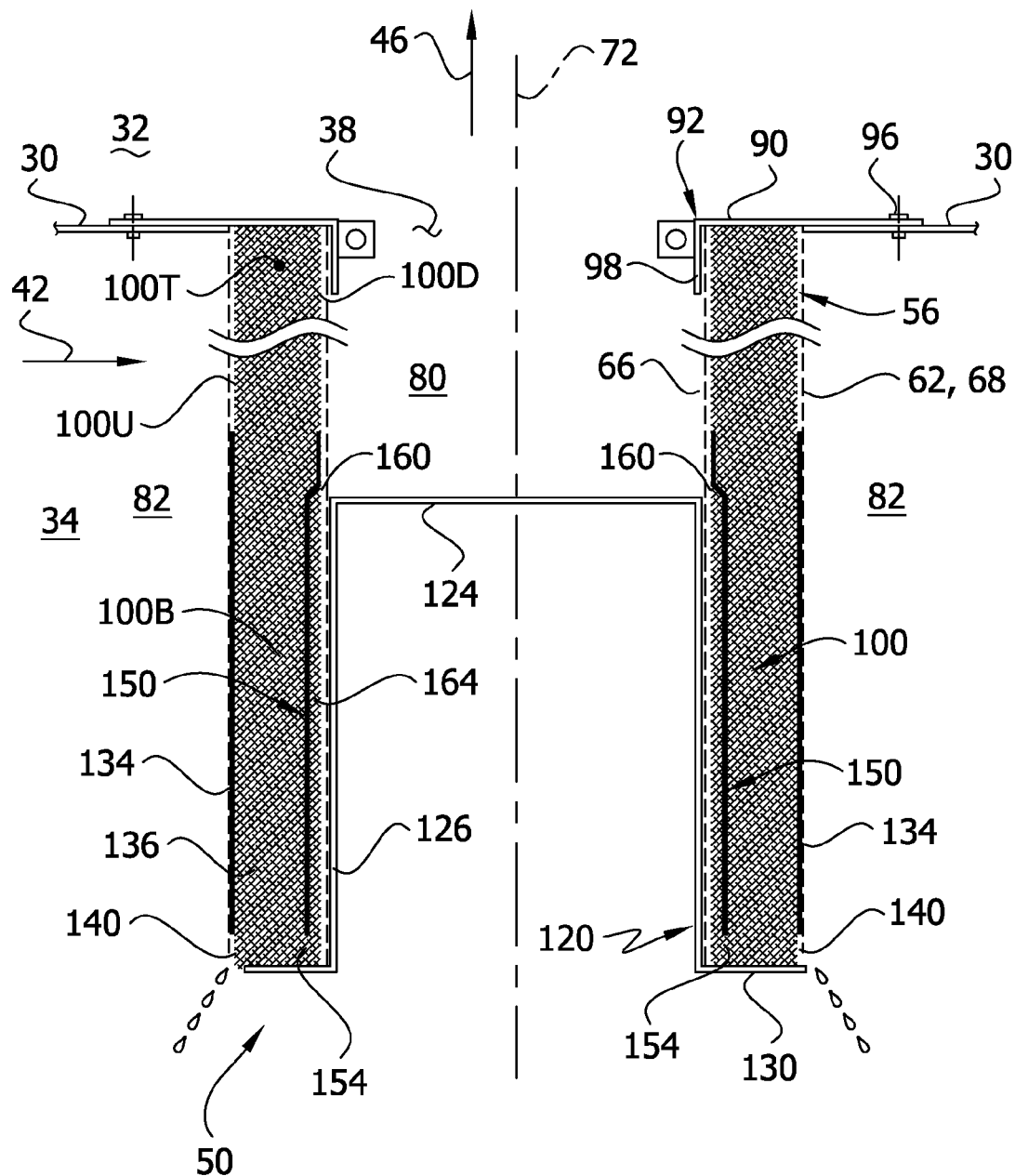
FIG. 2 is a schematic longitudinal section of the fiber bed assembly taken in the plane of line 2-2 of FIG. 1.
Figure 3:
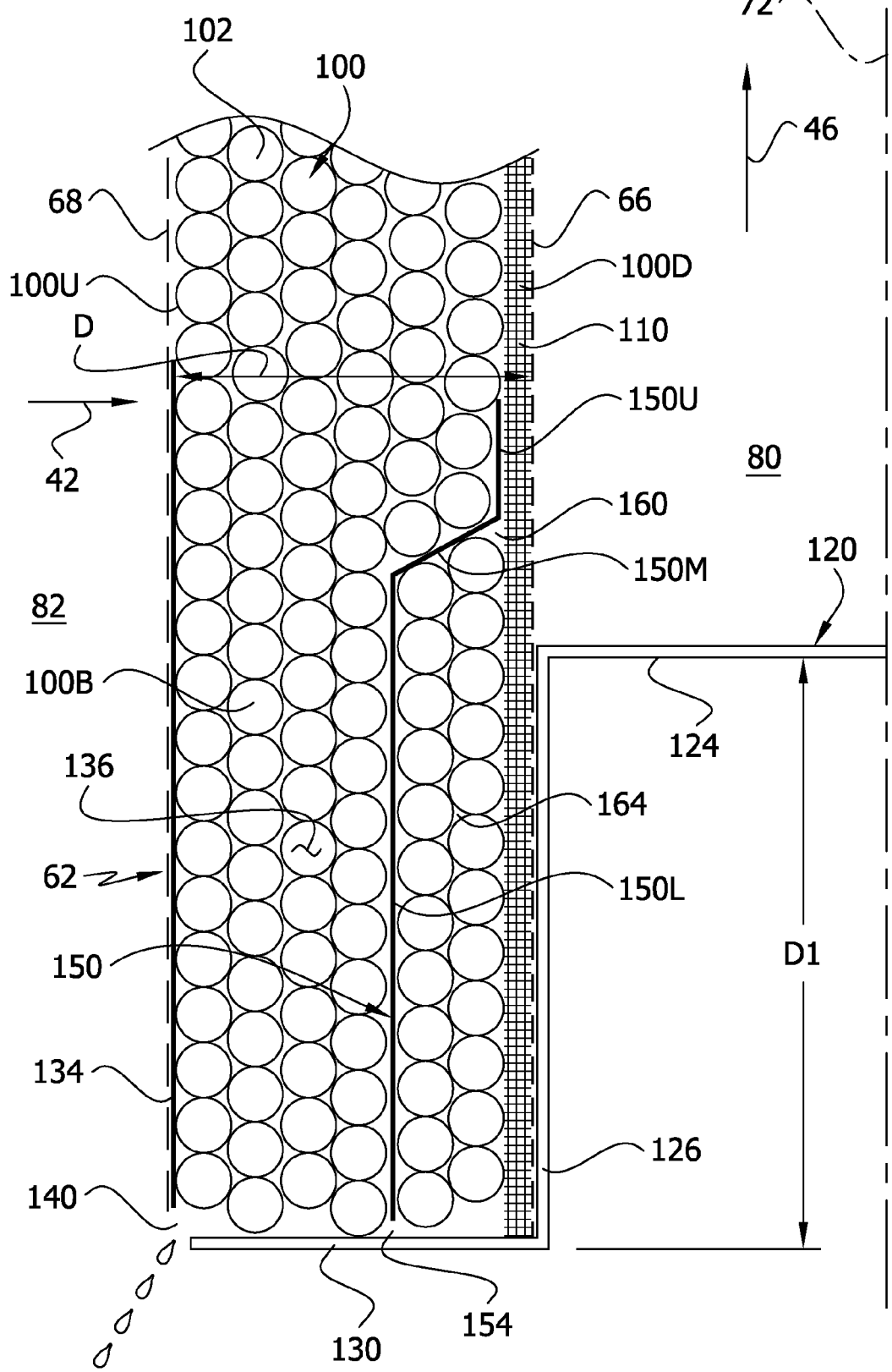
FIG. 3 is an enlarged portion of FIG. 2 showing drainage details of a lower portion of the fiber bed assembly.

Referring now to FIGS. 1-3, the fiber bed assembly 50 comprises a fiber bed support generally designated 56, having upper and lower ends 58, 60 and a generally cylindrical gas-permeable wall 62 extending between the upper and lower ends. In the illustrated embodiment, the wall 62 comprises a cylindrical inner screen 66 and a cylindrical outer screen 68 concentrically arranged in radially spaced relation with respect to a longitudinal axis 72. The wall 62 defines and separates an interior (downstream) space 80 inside the inner screen 66 from an exterior (upstream) space 82 within the tank 24 but outside the outer screen 68. It will be understood that the wall 62 may be constructed in other ways (e.g., having only a single screen or no screen) without departing from the scope of the present invention. The inner and outer screens 66, 68 are of a generally mesh construction so that they each define relatively large openings that permit the gas stream to move generally freely through the inner and outer screens from the exterior upstream space 82 to the interior downstream space 80. As illustrated in FIG. 2, the screens 66, 68 are connected to the annular flange 90 of a collar 92 which is fastened to the mounting plate 30 by suitable fasteners 96. The collar 92 has a cylindrical wall 98 extending down from the flange 90 on the inside (downstream) surface of the inner screen 66.

A fiber bed, generally indicated at 100, of the fiber bed assembly 50 is located in the space between the inner and outer screens 66, 68 and substantially fills the space and covers the openings in the screens so that the gas stream 42 must pass through the fiber bed 100 to move from the exterior space 82 surrounding the fiber bed assembly 50 to the interior space 80 within the fiber bed assembly (see FIG. 2). The fiber bed 100 is sealed at its upper end to the annular flange 90 of the collar 92.

The fiber bed 100 has a top end margin 100T, a bottom end margin 100B, an upstream surface 100U adjacent the exterior upstream space 82, and a downstream surface 100D adjacent the interior downstream space 80 (FIG. 2). The fiber bed 100 comprises a collection fiber media 102 which can be formed in various ways. For example, it may be formed by winding a roving made of collecting fibers around a cylindrical support screen (i.e., a wound bed) such as described in U.S. Pat. No. 4,915,714 (Teague, et al.), or the fiber bed 100 may take the form of a mat of collecting fibers wrapped around or pulled like a sleeve over a cylindrical support screen such as described in U.S. Pat. No. 5,605,748 (Kennedy, et al). Similarly, the present invention is not limited by the material from which the collecting fibers are made or the size of the collecting fibers. For example, the collecting fibers may be made from metals (e.g., stainless steel, titanium, etc.), polymeric materials (e.g., polyesters, polyvinylchloride, polyethylene terphthalate, nylons, polyethylene, polypropylene, etc.) as well as glass. In applications where corrosive conditions and/or high temperatures are encountered, chemical grade glass fibers are particularly useful. Generally, fibers having a diameter ranging from 5 µm or less to more than 200 µm, as well as combinations of fibers made from different materials of varying diameters are used to form the fiber bed. Moreover, the fiber bed 100 may include additional functional components such as strengthening scrims and re-entrainment control or drainage layers such as those described in U.S. Pat. No. 4,086,070 (Argo et al.) and U.S. Pat. No. 7,416,576 (Ziebold et al.), both of which are incorporated herein by reference. As illustrated in FIG. 3, the fiber bed 100 includes drainage media 110 located immediately adjacent the inner screen 66 of the fiber bed support 56 and extending the substantially the full length (height) of the fiber bed. The selection of the type and size of the fibers to employ for the collection media and drainage media and the method of constructing the fiber bed 100 and securing the bed to the fiber bed support 56 to obtain the desired bulk density, void fraction, pressure drop and drainage characteristics and achieve the desired separation efficiency under specified design operating conditions (e.g., particulate loading, gas flow rate, etc.) is known to those skilled in the art and this practice is readily adapted in the design of the fiber bed assembly 50 in accordance with the present invention.

Referring to FIGS. 2 and 3, the fiber bed assembly 50 further comprises a base, generally designated 120, adjacent the lower ends of the fiber bed support 56 and fiber bed 100. The base 120 is of an air-impermeable material (e.g., stainless steel) and acts as a seal to block movement of the gas stream 46 down through the lower end of the interior downstream space 80. As a result, the gas stream is forced up through the opening 38 at the upper end of the fiber bed support 56. The base 120 comprises a top wall 124 extending in a radial plane with respect to the longitudinal axis 72, a cylindrical side wall 126 extending down from the top wall, and an annular flange 130 extending in a generally radial direction from the lower end of the side wall 126 and underlying the lower ends of the screens 66, 68 and fiber bed 100. Desirably, the top and side walls 124, 126 have a shape and size closely conforming to the outline of the interior downstream space 80 to block the exit of gas in a downward direction.

A gas-impervious veil 134 is spaced a distance D upstream from the downstream surface 100D of the fiber bed 100 to provide a gas-shielded drainage area 136 between the veil 134 and the downstream surface 100D of the fiber bed. The distance D may vary. (See FIG. 12, for example.) In the embodiment illustrated in FIGS. 2 and 3, the distance D is such that the veil covers the upstream surface 100U of the fiber bed 100 at the bottom end margin 100B of the fiber bed. The veil 134 is constructed to function as an outer barrier layer to block flow of the gas stream 42 into the drainage area 136 of the fiber bed 100 from the exterior upstream space 82. The veil 134 is generally cylindrical in shape and has upper and lower ends. The lower end of the veil 134 is spaced above the flange 130 of the base 120 to define a drain opening 140 through which the fiber bed 100 is exposed between the veil and the base for drainage of aerosols from the fiber bed. Desirably, the height of the drain opening 140 is relatively small (e.g., up to two in.) to reduce the amount of surface area exposed to inflowing gas from the upstream space 82. Desirably, the veil 134 extends to a height above the top wall 124 of the base 120 so that aerosols collecting on the top wall are shielded from the gas flow 42 by the veil.

As explained above, the veil 134 functions to shield the bottom end margin 100B of the fiber bed 100 from gas flow 42. Any aerosols in this drainage area 136 of the fiber bed 100 are subjected to substantially less gas flow drag than the overlying area of the fiber bed. As a result, aerosols in this area readily drain by gravity to the lower end of the fiber bed 100 for disposal through the drain opening 140 and drain pipe 48 (see FIG. 1). This process is described in more detail later.

The veil 134 is of a suitable gas-impermeable material, and it may be formed by a single layer or by multiple layers of the same or different materials. Exemplary materials include metal resistant to process conditions, glass, PTFE (polytetrafluoroethylene), PFA (perfluoroalkoxy copolymer resin), PE (polyethylene), PP (polypropylene), PPS (polyphenylenesulfide) or other suitable thin layer materials which are impervious or semi-impervious to gas flow under process conditions. In one example, the veil 134 is of a heat sealable material such as PFA wrapped around the fiber bed support 56 and secured in position by an overlap heat seal. The material used has a suitable thickness, e.g., in the range of 0.001 to 0.500 in.

The fiber bed assembly 50 also includes a gas-impermeable inner barrier, generally designated 150, at least a portion of which is disposed within the fiber bed 100 generally at the bottom margin 100B thereof for blocking flow of the gas stream 42 through the fiber bed past the inner barrier. As best illustrated in FIG. 3, the inner barrier 150 comprises a first (lower) portion 150L in generally opposed, spaced relation with the veil 134 on an upstream surface of the inner barrier and in generally opposed, spaced relation with the side wall 126 on a downstream surface of the inner barrier. The lower portion 150L has a bottom end spaced above the annular flange 130 of the base 120 to provide a gap 154 for drainage of aerosols along the flange 130 in a radial outward direction toward the drain opening 140 between the veil 134 and the flange. The upper end of the lower portion 150L of the inner barrier 150 extends up to a position above the top wall 124 of the base 120. A second (middle) portion 150M of the inner barrier 150 extends from the upper end of the lower portion 150L to adjacent the downstream surface 100D of the fiber bed 100. A third (upper) portion 150U of the inner barrier 150 extends upward from the upper end of the middle portion 150M along the downstream surface 100D of the fiber bed 100 to an elevation about the same as the upper end of the outer veil 134. The upper portion 150U of the inner barrier 150 is spaced above the top wall 124 of the base 120 by a distance of up to 10 in. to provide a drain gap 160. Aerosols collected on the top wall 124 of the base 120 flow through this gap 160 into the fiber bed 100 and then move down through the fiber bed via a passage 164 defined between the inner barrier 150 and side wall 126 of the base toward the flange 130 of the base. From there, the aerosols can pass through the drainage gap 154 between the inner barrier 150 and the flange 130 toward the upstream surface 100U of the fiber bed 100 for drainage out of the fiber bed via the drainage opening 140.

The inner barrier 150 is of a suitable gas-impermeable material, and it may be formed by a single layer or by multiple layers of the same or different materials. Exemplary materials include metal resistant to process conditions, glass, PTFE (polytetrafluoroethylene), PFA (perfluoroalkoxy copolymer resin), PE (polyethylene), PP (polypropylene), PPS (polyphenylenesulfide) or other suitable thin layer materials which are impervious or semi-impervious to gas flow under process conditions. The material used has a suitable thickness, e.g., in the range of 0.001 to 0.500 in.

By way of example only, the collecting fiber media 102 and drainage fiber media 110 illustrated in FIGS. 2 and 3 may comprise a plurality of layers of collecting fibers and drainage fibers, respectively, such that the fiber bed 100 has an overall thickness between the inner and outer screens 66, 68 in the radial direction of up to about six in. In one example, the drainage media 110 comprises 1 to 10 layers on the downstream face 100D of the fiber bed, and the collection media 102 comprises 1 to 10 layers between the inner barrier 150 and the drainage layer 110 and a greater number of layers between the inner barrier and the outer veil 134.

In operation, the gas stream 42 enters the mist eliminator 20 through the inlet 40 and moves through the fiber bed 100 from the exterior upstream space 82 to the interior downstream space 80. From there, the gas stream 46 exits the opening 38 at the upper end of the fiber bed 100 and moves through the outlet 44 of the eliminator 20. As the gas stream 42 moves through the fiber bed 100, aerosols in the gas stream coalesce on the collection fibers 102, and most of the collected aerosols move under the influence of gas flow drag to the downstream side 100D of the fiber bed. The liquid then moves either by wicking action into the gas shielded drainage area 136 at the bottom edge margin 100B of the fiber bed 100 or drains down on the interior downstream surface 100D of the fiber bed (via the drainage media 110) to the top wall 124 of the base 120. Liquid collecting on the top wall 124 is able to pass through the drain gap 160, down through the passage 164, and then along the flange 130 through the gap 154 between the inner barrier 150 and the flange to the drainage opening 140 at the outer periphery of the flange of the base.

For most efficient operation, the side wall 126 of the base 120 should extend up into the interior downstream space a distance D1 (FIG. 3) such that aerosols collecting in the gas-shielded drainage area 136 of the fiber bed 100 are able to develop a head pressure greater than the pressure differential under maximum operating conditions between the higher pressure in the exterior upstream space 82 and the lower pressure in the interior downstream space 80. As a result, liquid in this area will drain under the influence of gravity down to the flange 130 of the base 120 and out the drainage opening 140. D1 can be calculated using the following formula:

$$D1 = \frac{62.4 \times SF \times (P1 - P2)}{\rho_{DF}}$$

where: SF=safety factor (e.g., 1.05 to 1.2); P1=static pressure in upstream exterior space 82 (lb/in$^2$); P2=static pressure in downstream interior space 80 (lb/in$^2$); and $\rho_{DF}$=density of draining fluid at process temperature (lb/ft$^3$). In general, D1 is between 5% and 30% of the overall axial length of the fiber bed 100, depending on the design pressure drop across the fiber bed and the density of the liquid. D1 is typically no greater than about 50 in.

Figure 4:
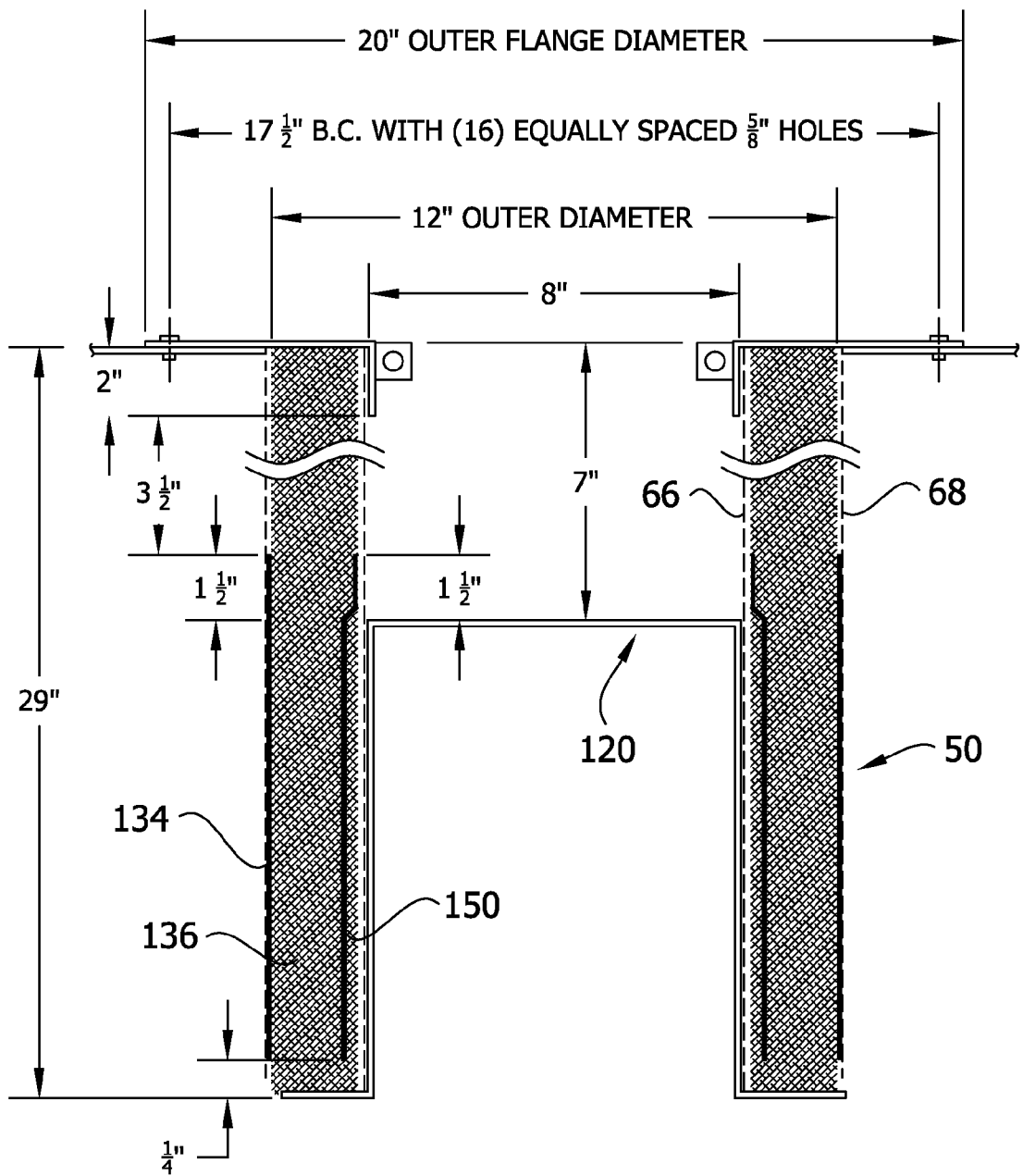
FIG. 4 is a view similar to FIG. 2 showing exemplary dimensions.

FIG. 4 shows the fiber bed assembly 50 with exemplary dimensions. These dimensions will vary from application to application, as will be understood by those skilled in this field. In this example, the collar 92 and base 120 of the fiber bed assembly 50 are made from stainless steel, and the fiber bed 100 is made from 6 to 10 micron fiber glass packed to a density of 8 to 20 lbs per cubic foot. The outer screen 68 is constructed of wire having an outside diameter of 0.105 in. resistance welded to form 2 in.×2 in. openings, and the inner screen 66 is constructed of wire having an outside diameter of 0.148 in. resistance welded to form 2 in.×2 in. openings. Other materials and dimensions may be used.

Figure 5:
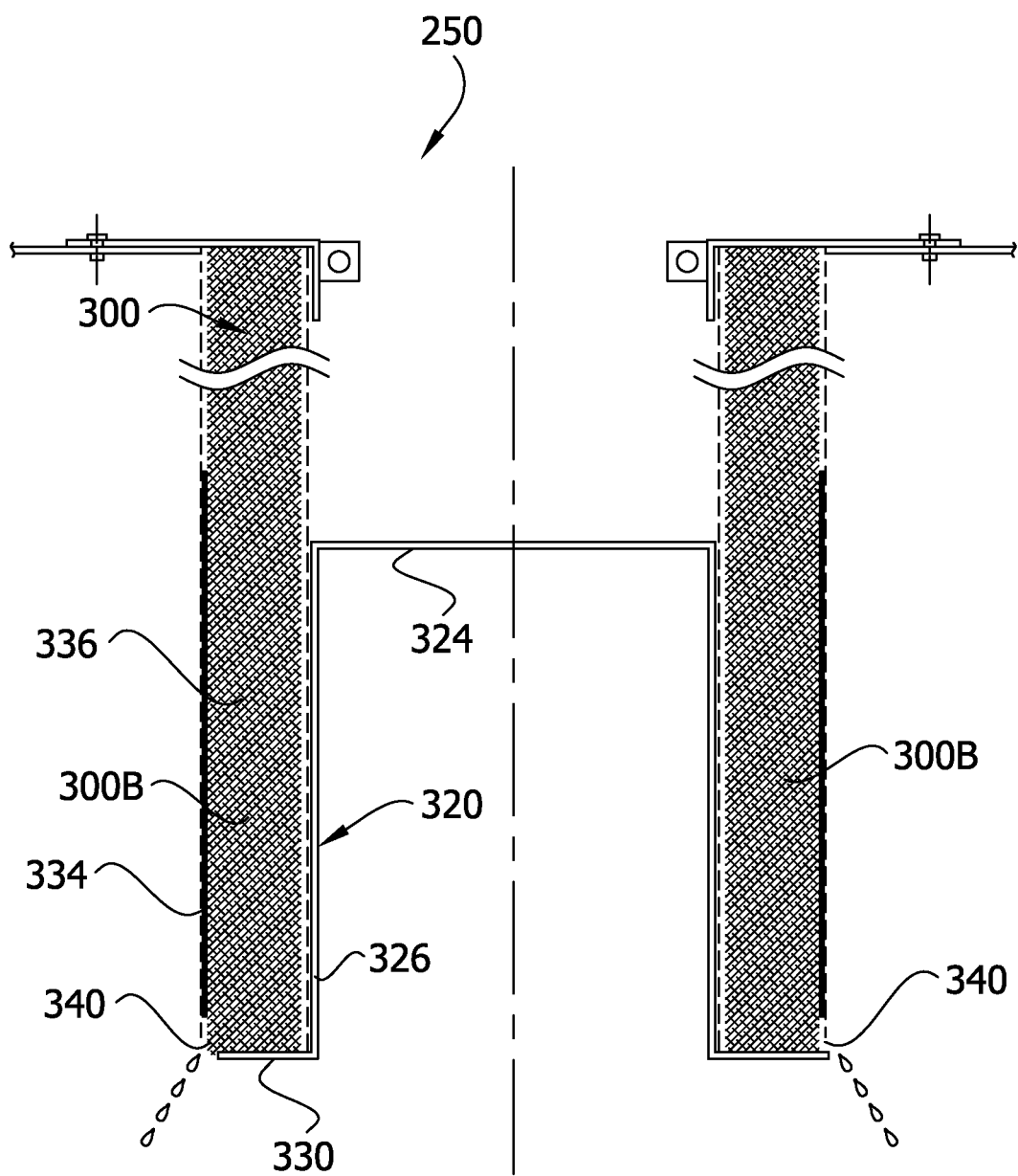
FIG. 5 is a schematic longitudinal section showing a second embodiment of a fiber bed assembly of this invention.

FIG. 5 shows a second embodiment of a fiber bed assembly of this invention, generally designated 250. The assembly 250 is similar to the fiber bed assembly 50 of the first embodiment, and corresponding elements are designated by corresponding reference numbers, plus 200. The difference between the first and second embodiments is that, in the second embodiment, the fiber bed assembly 250 has no inner barrier corresponding to the inner barrier 150 of the first embodiment. Fluid draining down in the fiber bed 300 and fluid collecting on the top wall 324 of the base 320 wicks into the gas-shielded drainage area 336 at the bottom margin 300B of the fiber bed 300 created between the outer veil 334 and the side wall 326 of the base for exit through the drainage opening 340 between the lower end of the veil 334 and the flange 330 of the base.

Figure 6:
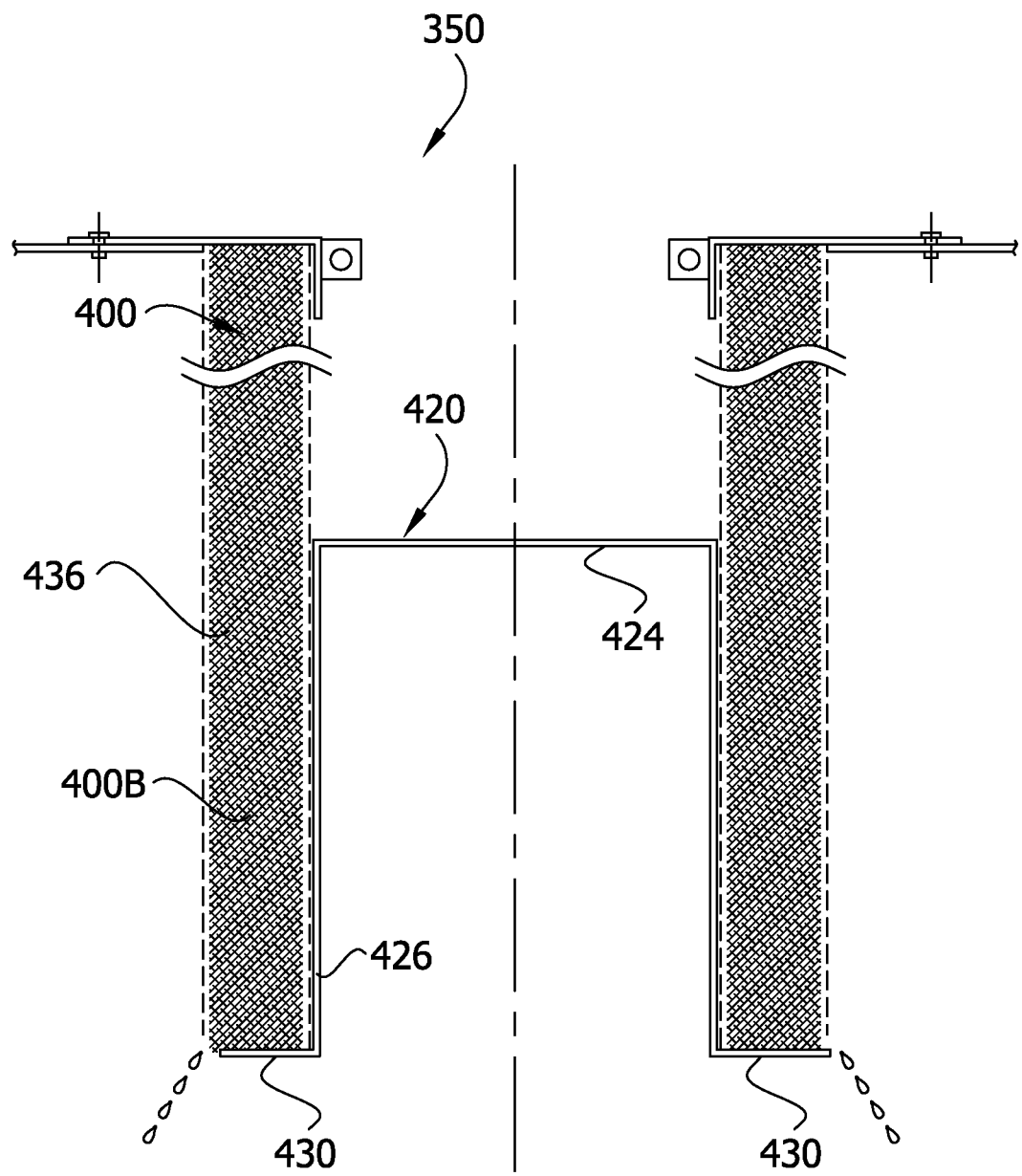
FIG. 6 is a schematic longitudinal section showing a third embodiment of a fiber bed assembly of this invention.

FIG. 6 shows a third embodiment of a fiber bed assembly of this invention, generally designated 350. The assembly 350 is similar to the fiber bed assembly 50 of the first embodiment, and corresponding elements are designated by corresponding reference numbers, plus 300. The difference between the first and third embodiments is that, in the third embodiment, the fiber bed assembly 350 has no veil or inner barrier corresponding to the veil 134 and inner barrier 150 of the first embodiment. However, the side wall 426 of the base 420 does impede movement of the gas stream through the bottom margin 400B of the fiber bed 400, thereby creating a gas-shielded drainage area 436 similar to the gas-shielded drainage area of the first embodiment, although the degree of shielding is less than in the previous two embodiments. Fluid draining down in the fiber bed 400 and fluid collecting on the top wall 424 of the base 420 wicks into the gas-shielded drainage area 436 at the lower edge margin 400B of the fiber bed and moves down to the flange 430 of the base for drainage over the outer peripheral edge of the flange.

Figure 7:
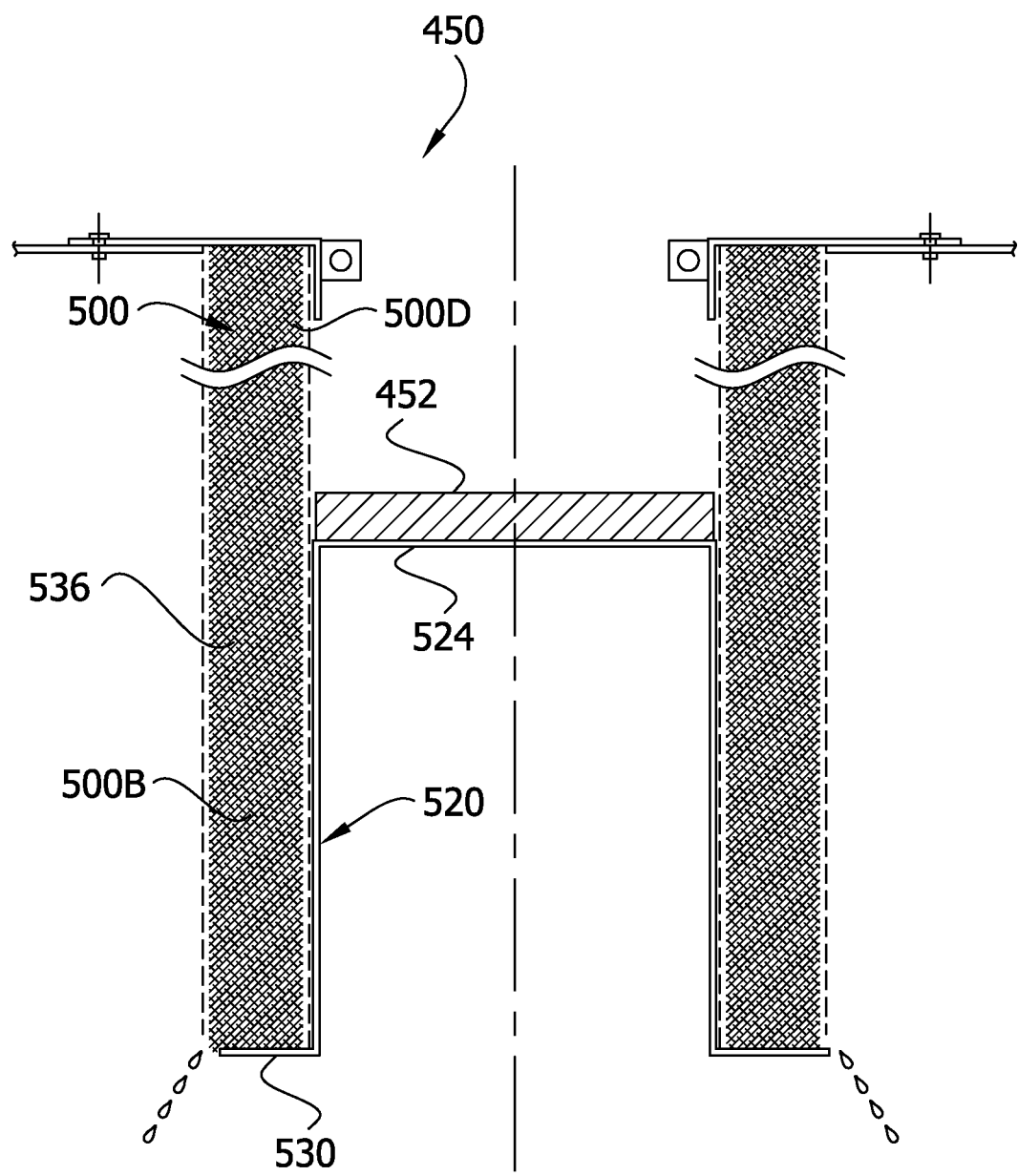
FIG. 7 is a schematic longitudinal section showing a fourth embodiment of a fiber bed assembly of this invention.

FIG. 7 shows a fourth embodiment of a fiber bed assembly of this invention, generally designated 450. The assembly 450 is essentially identical to the fiber bed assembly 350 of the third embodiment, except that an absorbent pad 452 is located on the top wall 524 of the base 520 for absorbing fluid collecting on the base. The pad 452 may be made of suitable material resistant to client process such as carbon steel, 304 stainless steel, 316 stainless steel, or other alloy deemed suitable, or polymeric materials such as PTFE (polytetrafluoroethylene), PFA (polyfluoroalkoxy copolymer resin), PE (polyethylene), PP (polypropylene), PPS (polyphenylenesulfide) or other suitable material, such as 6 to 11 mil diameter crimped wire mesh layers compacted to a density of 5 to 12 lbs per cubic foot. The pad 452 may be formed by only one layer of material, or it may be formed by multiple layers of the same or different materials. Desirably, the pad 452 is sized so that its outer perimeter either contacts or is closely adjacent the downstream surface 500D of the fiber bed 500 so that aerosols draining down this surface are absorbed by the pad. In the event the pad 452 becomes saturated, excess fluid will wick into the fiber bed 500 and drain down through the gas-shielded drainage area 536 at the lower edge margin 500B of the fiber bed to the flange 530 of the base 520 for drainage over the outer peripheral edge of the flange.

Figure 8:
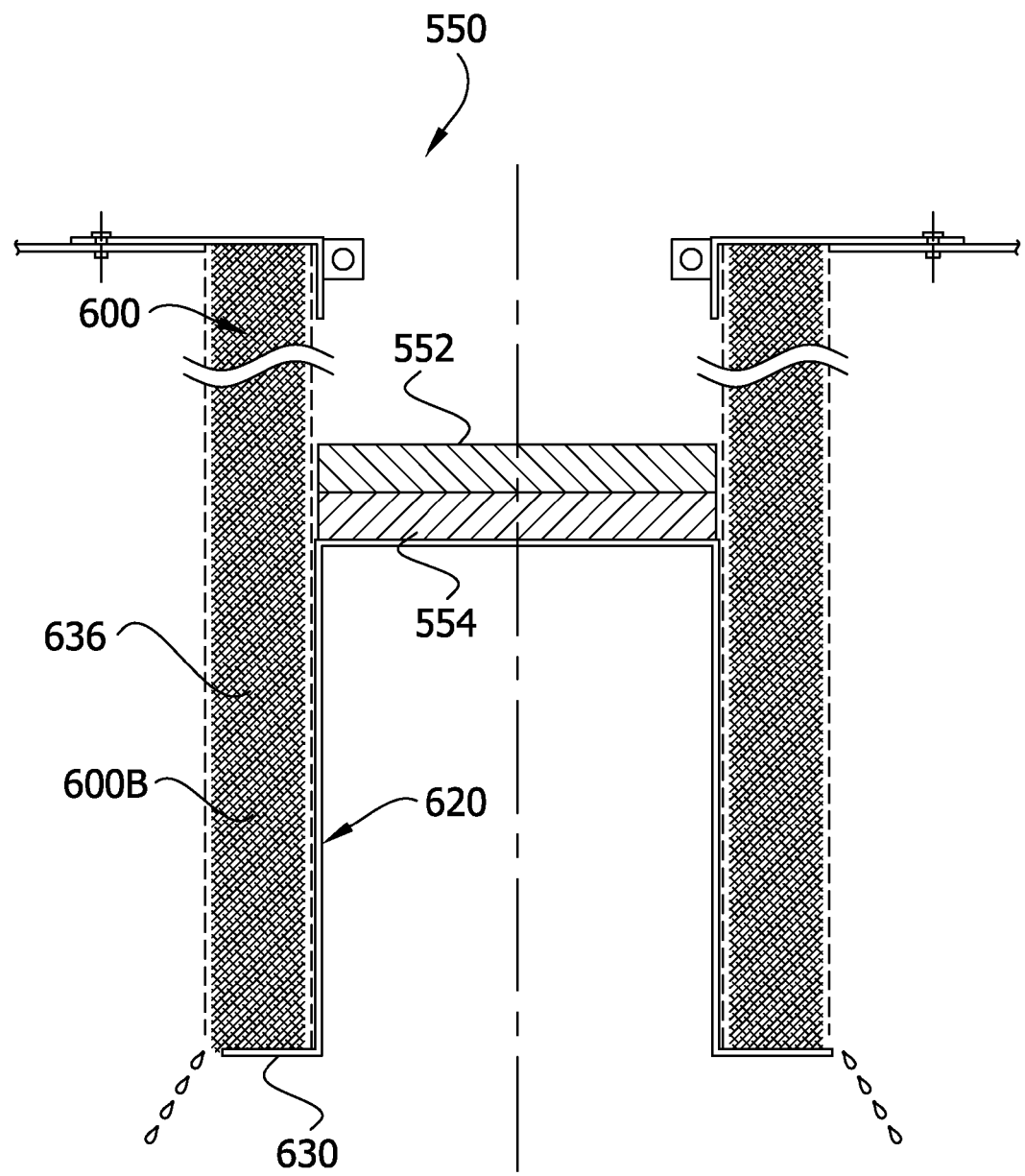
FIG. 8 is a schematic longitudinal section showing a fifth embodiment of a fiber bed assembly of this invention.

FIG. 8 shows a fifth embodiment of a fiber bed assembly of this invention, generally designated 550. The assembly 550 is essentially identical to the fiber bed assembly 450 of the fourth embodiment, except that a second absorbent pad 554 of collecting fiber media is located on the top wall of the base below a first absorbent pad 552 identical to the absorbent pad 452 of the fourth embodiment. The second pad 554 desirably is made of collecting fiber media of the type described above in regard to the fiber bed 100, but the pad 554 has a pack density greater than (e.g., six to seven times greater than) the pack density of the collecting fiber media 102 in the fiber bed 100. The pad 554 may be formed by only one layer of material, or it may be formed by multiple layers of the same or different materials. Like the pad 552 above it, the pad 554 of collecting fiber media is sized so that its outer perimeter either contacts or is closely adjacent the downstream surface of the fiber bed 600 so that aerosols draining down this surface are absorbed by the pad 554. In the event the pad becomes saturated, excess fluid will wick into the fiber bed 600 and drain down through the gas-shielded drainage area 636 at the lower edge margin 600B of the fiber bed to the flange 630 of the base 620 for drainage over the outer peripheral edge of the flange.

Figure 9:
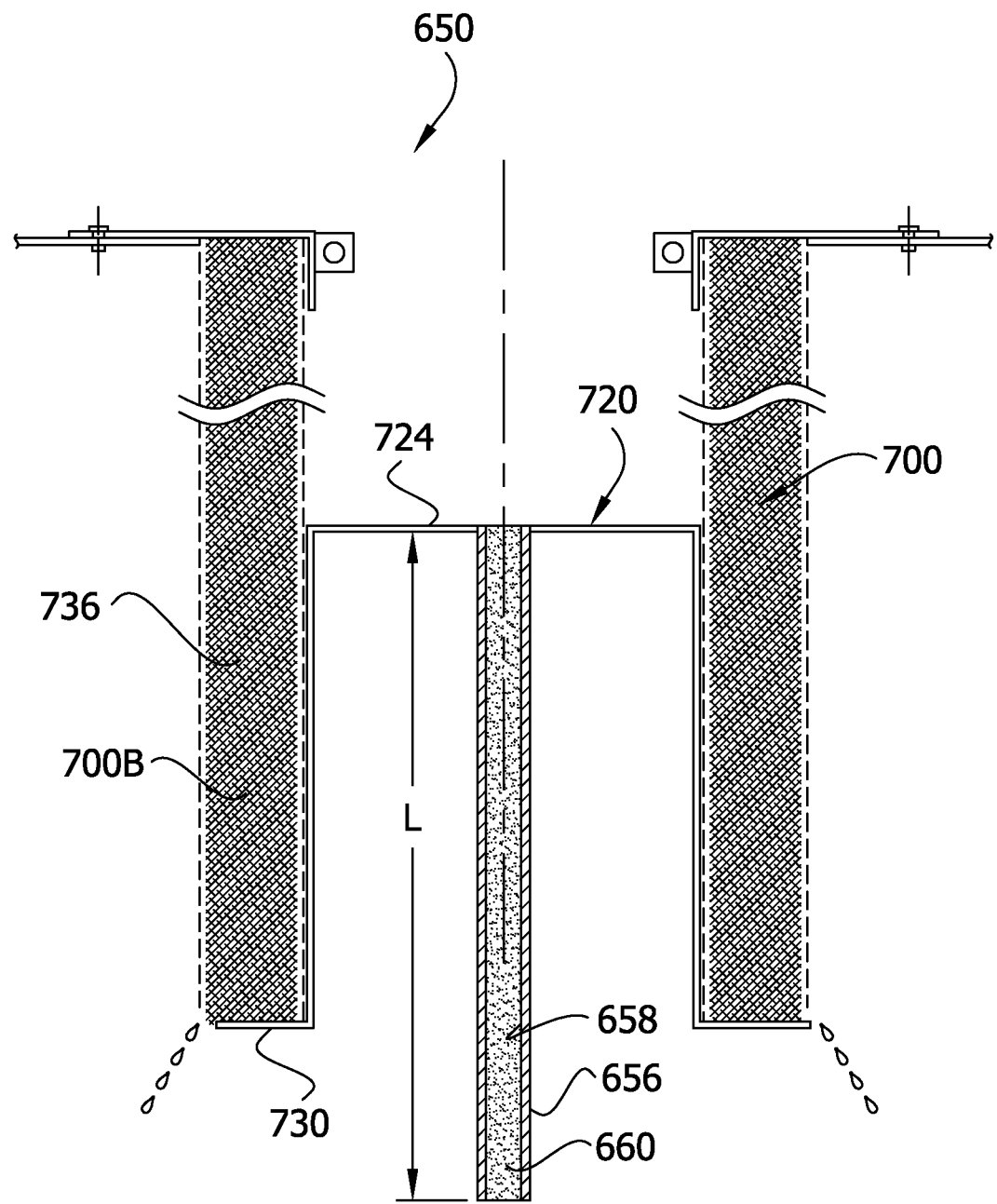
FIG. 9 is a schematic longitudinal section showing a sixth embodiment of a fiber bed assembly of this invention.

FIG. 9 shows a sixth embodiment of a fiber bed assembly of this invention, generally designated 650. The assembly 650 is similar to the fiber bed assembly 350 of the third embodiment (see FIG. 6) except that the assembly 650 includes a leg 656 extending downwardly from the top wall 724 of the base 720. The leg 656 has a passage 658 therein for draining aerosols collected by the fiber bed assembly 650. By way of example, the leg 656 may be a tube defining the passage 658. The passage 658 is packed with a fibrous packing material 660 having a density greater than the density of the fiber bed 700. By way of example but not limitation, the packing material 660 may have a packing density in the range of 5 to 50 lb/ft³. The minimum length L of the leg can be determined by the following formula:

$$L = \frac{62.4 \times SF \times dP}{\rho_{liquid}}$$

where: SF=design safety factor (typically 1.05 to 1.2); dP=maximum design pressure drop across the fiber bed (lb/in²); and $\rho_{liquid}$=density of draining liquid at process conditions (lb/ft³).

Aerosols collecting on the top wall 724 of the base 720 will either drain into the leg 656 for absorption by the packing material 660 or wick into the gas-shielded drainage area 736 at the lower edge margin 700B of the fiber bed and move down to the flange 730 of the base 720 for drainage over the outer peripheral edge of the flange. The advantage of this design over conventional seal-leg designs is that there is no need for a seal cup. Also, the length of the packed leg 656 can be less than the length of a conventional seal leg.

Figure 10:
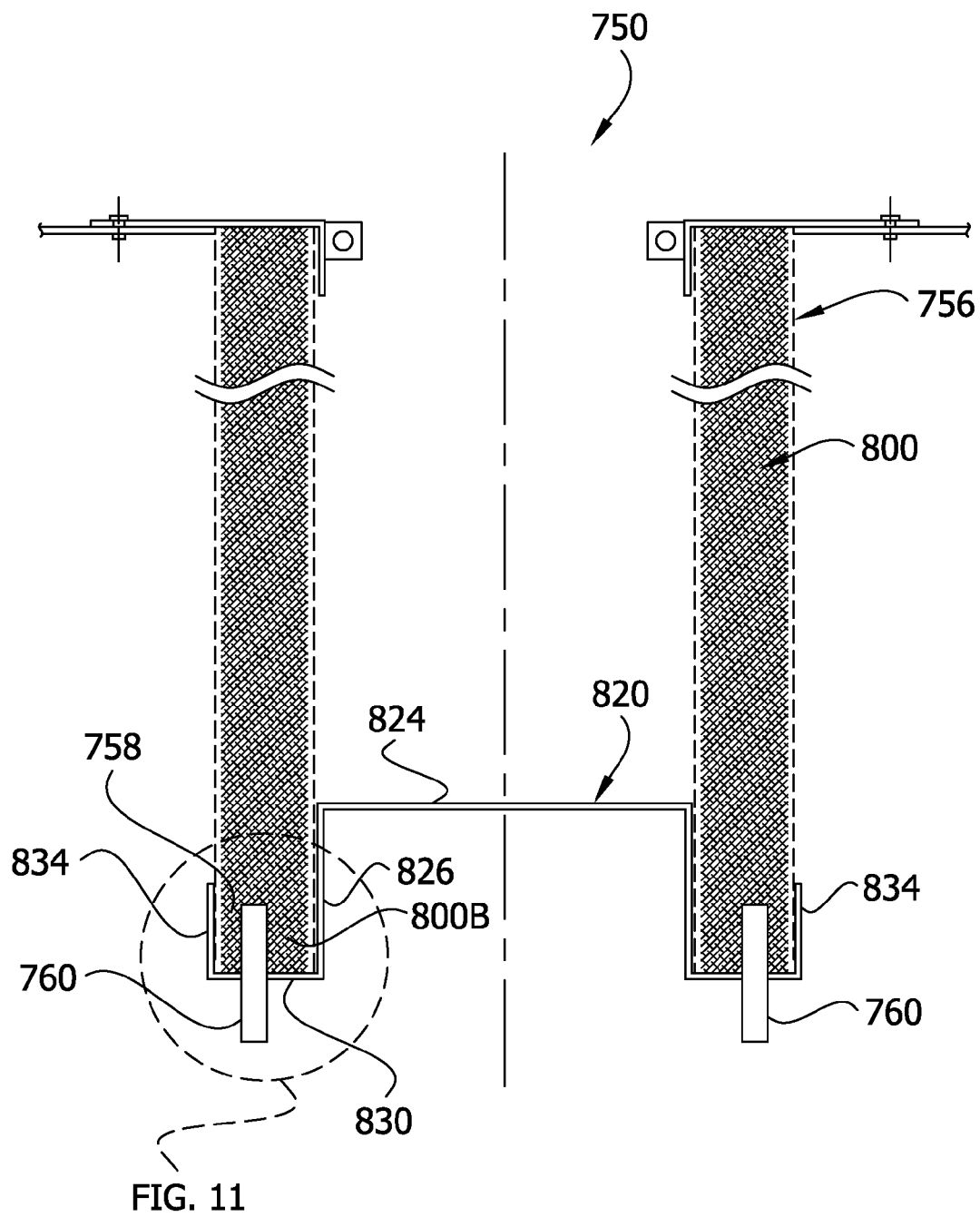
FIG. 10 is a schematic longitudinal section showing a seventh embodiment of a fiber bed assembly of this invention.
Figure 11:
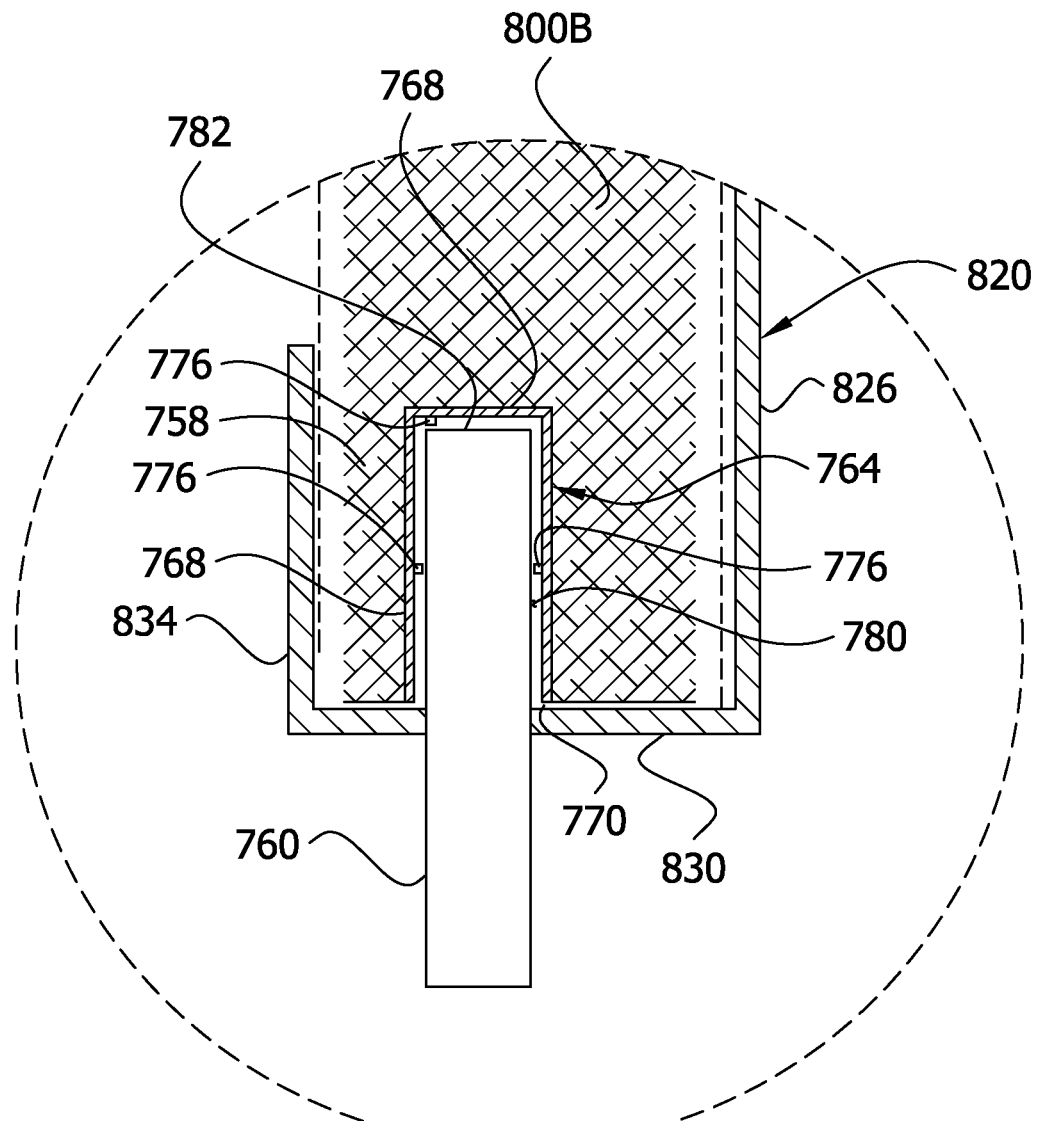
FIG. 11 is an enlarged portion of FIG. 10.

FIGS. 10 and 11 show a seventh embodiment of a fiber bed assembly of this invention, generally designated 750. The assembly 750 comprises a fiber bed support 756 and fiber bed 800 similar to the previous embodiments. The assembly also includes a top-hat shaped base 820 having a top wall 824, a relatively short side wall 826 (compared to the base side walls of the first two embodiments), and an annular flange 830 projecting generally in a radial direction from the side wall adjacent its lower end. A gas-impervious veil 834 extends up from the annular flange 830 in spaced relation to the side wall 826 of the base 820 and covers the upstream surface of the fiber bed 800 at the bottom end margin 800B of the fiber bed disposed between the veil 834 and base side wall 826. In the illustrated embodiment, the veil 834 extends up from the outer peripheral edge of the flange 830. The veil 834 has an upper end at an elevation below the top wall 824 of the base and a lower end attached to the annular flange 830 such that there is no drainage opening at the outer periphery of the flange as in the first two embodiments. The veil 834 is constructed to block flow of the gas stream into the fiber bed 800 from the exterior upstream space, thus creating a gas-shielded drainage area 758 between the veil 834 and the side wall 826 of the base 820 at the bottom end margin 800B of the fiber bed 800, as in the first two embodiments.

At least one and desirably two or more drain tubes 760 extend up through the flange 830 of the base 820 to an elevation somewhat below the upper end of the veil 834. As illustrated in FIG. 11, a siphon cap 764 is positioned over each drain tube 760. The cap 764, which is embedded in the bottom edge margin 800B of the fiber bed 800, has a top wall 768 and a cylindrical side wall 768 which extends down to a location spaced above the flange 830 of the base 820 to define a siphon cap inlet 770 adjacent the flange for entry of fluid into the interior of the cap. The drain tube 760 has an outside diameter less than the inside diameter of the cap 764 and a height above the flange 830 less than the height of the top wall 768 of the tube above the flange. A drain tube positioning system comprising guide elements 776 on the cap 764 are engageable with the outside wall and top of the drain tube 760 to space the drain tube from the cap to provide a flow passage or conduit 780 extending from the cap inlet 770 to an opening 782 in the drain tube located at an elevation above the cap inlet. In the illustrated embodiment, the opening 782 is defined by the open top of the tube, but other configurations are possible. The cap inlet 770, flow passage 780, drain opening 782 and drain tube 760 define a siphon flow path for siphoning of liquid from the gas-shielded drainage area 800B. Liquid flowing into the drain tube 760 drains down to a lower end of the tube below the flange 830 of the base 820 for exit of liquid from the tube for suitable disposal.

The arrangement is such that as aerosols drain into the gas-shielded drainage area 758, liquid will flow through the siphon cap inlet(s) 770 and into the flow passage(s) 780 until the level of the collected liquid rises above the drain opening(s) 782 of the drain tube(s) 760. The liquid then drains down through the tube(s) 760, creating a siphoning effect that is effective to drain substantially all liquid from the drainage area 758 along the aforementioned siphon flow path. The advantage of this design is that length (height) of the base side wall 826 can be reduced compared to the designs of the first five embodiments.

The drain tube 760, siphon cap 764 and guide elements 776 can have other configurations without departing from the scope of this invention.

Figure 12:
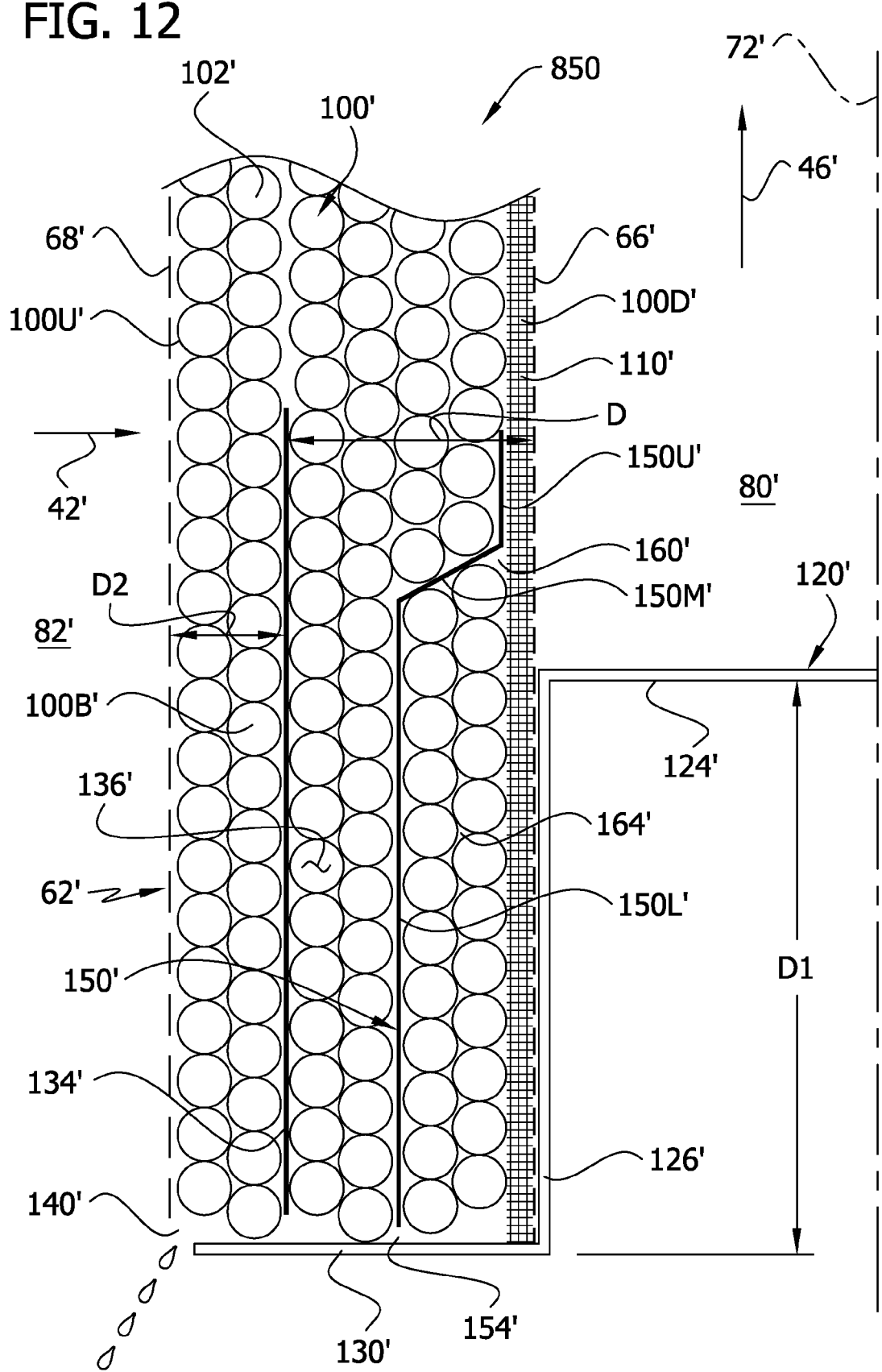
FIG. 12 is a partial schematic longitudinal section showing a seventh embodiment of a fiber bed assembly of this invention.

FIG. 12 a partial schematic longitudinal section showing an eighth embodiment of a fiber bed assembly of this invention, generally designated 850. Except as hereinafter described, this embodiment is identical to the fiber bed assembly 50 of the first embodiment, and corresponding parts are designated by corresponding reference numbers with the addition of a prime (') designation. In this embodiment, the gas-impervious outer veil 134' is disposed within (embedded) in the fiber bed 100'. That is, the veil 134' is spaced a distance D2 downstream from the upstream surface 100U' of the fiber bed. This arrangement protects the veil 134' from damage. The distance D2 can be any distance, so long as the veil 134' is positioned to function as a barrier to block the flow of the gas stream 42' into at least a portion of the bottom margin 100B' of the fiber bed 100' so that liquid can drain down through the gas-shielded drainage area 136' for exit from the assembly 850.

The inner barrier 150' in the embodiment of FIG. 12 may also be positioned at any distance from the downstream surface 100D' of the fiber bed 100'. Further, the inner barrier 150' may be eliminated entirely, as in the embodiment of FIG. 5.

Having described the invention in detail, it will be apparent that modifications and variations are possible without departing from the scope of the invention defined in the appended claims.

The following non-limiting examples are provided to further illustrate the present invention.

When introducing elements of the present invention or the preferred embodiment(s) thereof, the articles "a", "an", "the"

and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and processes without departing from the scope of the invention, it is intended that all matter contained in the above description and shown in the accompanying figures shall be interpreted as illustrative and not in a limiting sense.

What is claimed is:

1. A fiber bed assembly for a forward-flow fiber bed mist eliminator used to remove aerosols from a moving gas stream, the fiber bed assembly comprising:
 a fiber bed support having an upper end, a lower end, and a substantially cylindrical wall extending between the upper and lower ends defining an exterior upstream space outside the wall and an interior downstream space inside the wall, the wall including openings therein to permit the gas stream to move generally freely through the wall from the exterior upstream space to the interior downstream space;
 a fiber bed supported by the fiber bed support and generally blocking the wall openings so that the gas stream passes through the fiber bed moving from the exterior upstream space to the interior downstream space, the fiber bed comprising collecting fiber media and having a top, a top end margin, a bottom, a bottom end margin, an upstream surface and a downstream surface;
 a base adjacent the lower end of the fiber bed support blocking movement of the gas stream down through a lower end of the interior downstream space, the base including a side wall arranged in opposed relation with a portion of the downstream surface of the fiber bed for blocking flow of the gas stream from the fiber bed to the downstream space through said downstream surface portion, the side wall including a top and a bottom;
 an opening adjacent an upper end of the fiber bed support for exit of the gas stream from the interior downstream space;
 a gas-impervious veil spaced upstream from the downstream surface of the fiber bed at the bottom end margin of the fiber bed, the veil having an upper end and a lower end and being constructed to block flow of the gas stream into at least a portion of the fiber bed to provide a gas-shielded drainage area in the fiber bed between the gas-impervious veil and the downstream surface of the fiber bed for drainage of aerosols from the fiber bed, the lower end of the veil being spaced upward from the bottom of the fiber bed, the lower end of the veil being spaced downward from the top of said side wall of the base, and the upper end of the veil being spaced upward from the top of said side wall of the base.

2. A fiber bed assembly as set forth in claim 1 further comprising a drain opening below the upper end of the veil for draining aerosols collected by the fiber bed.

3. A fiber bed assembly as set forth in claim 1 wherein the veil is rigid.

4. A fiber bed assembly as set forth in claim 1 wherein the veil is made of a flexible material and is wrapped onto the fiber bed assembly.

5. A fiber bed assembly as set forth in claim 4 wherein the veil is made of at least one of metal, glass, PTFE (polytetrafluoroethylene), PFA (perfluoroalkoxy copolymer resin), PE (polyethylene), PP (polypropylene), and PPS (polyphenylenesulfide).

6. A fiber bed assembly as set forth in claim 1 wherein said base is positioned for receiving aerosols collected by the fiber bed and drained to the bottom of the fiber bed.

7. A fiber bed assembly as set forth in claim 6 wherein at least a portion of the base generally underlies the bottom of the fiber bed, the veil and the base being spaced to define a drain opening through which the fiber bed is exposed between the veil and base for drainage of collected aerosols from the fiber bed.

8. A fiber bed assembly as set forth in claim 6 wherein the base further comprises a leg projecting downwardly from the base, the leg defining a drain therein for draining said collected aerosols through the leg.

9. A fiber bed assembly as set forth in claim 8 wherein the leg is filled with a fibrous packing having a density when dry that is greater than a density of the fiber bed when dry.

10. A fiber bed assembly as set forth in claim 1 wherein the base comprises a flange generally underlying the fiber bed and a side wall extending from the flange and being arranged in opposed relation with a portion of the downstream surface of the fiber bed for blocking flow of the gas stream from the fiber bed to the downstream space through said downstream surface portion.

11. A fiber bed assembly as set forth in claim 10 wherein the fiber bed support, fiber bed and veil are generally cylindrical in shape, the flange being annular and the side wall being generally cylindrical in shape.

12. A fiber bed assembly as set forth in claim 11 wherein the base has a generally top hat shape.

13. A fiber bed assembly as set forth in claim 10 wherein the veil and the flange are spaced to define a drain opening through which the fiber bed is exposed between the veil and base for drainage of collected aerosols from the fiber bed.

14. A fiber bed assembly as set forth in claim 10 further comprising an inner barrier, at least a first portion of which is disposed within the fiber bed generally at the bottom margin thereof for blocking flow of the gas stream through the fiber bed past the inner barrier.

15. A fiber bed assembly as set forth in claim 14 wherein at least a portion of the inner barrier is positioned between the veil and the side wall, the inner barrier being in generally opposed, spaced relation with the veil on an upstream surface of the inner barrier and being in generally opposed, spaced relation with the side wall on a downstream surface of the inner barrier.

16. A fiber bed assembly as set forth in claim 15 wherein a second portion of the inner barrier extends from the first portion to adjacent the downstream surface of the fiber bed.

17. A fiber bed assembly as set forth in claim 16 wherein a third portion of the inner barrier extends from the second portion along the downstream surface of the fiber bed.

18. A fiber bed assembly as set forth in claim 17 wherein a bottom end of the inner barrier is spaced above the flange of the base.

19. A fiber bed assembly as set forth in claim 18 wherein the third portion of the inner barrier is located above the side wall, the inner barrier and side wall defining a passage for collected aerosols on the base to pass into the fiber bed between the side wall and the inner barrier toward the flange of the base, and between the inner barrier and the flange toward the upstream surface of the fiber bed for drainage out of the fiber bed.

20. A fiber bed assembly as set forth in claim 10 further comprising a pad located on a top wall of the base within the downstream space of the fiber bed.

21. A fiber bed assembly as set forth in claim 20 wherein the pad is made of a wire mesh material.

22. A fiber bed assembly as set forth in claim 21 further comprising a pad of collecting fiber media located on the top wall of the base below the wire mesh pad.

23. A fiber bed assembly as set forth in claim 1 wherein the veil covers the upstream surface of the fiber bed.

24. A fiber bed assembly as set forth in claim 1 wherein the veil is disposed within the fiber bed a distance downstream from the upstream surface of the fiber bed.

* * * * *